July 14, 1942.  W. A. RAY  2,289,456
ELECTROMAGNETICALLY OPERATED VALVE
Filed March 26, 1940
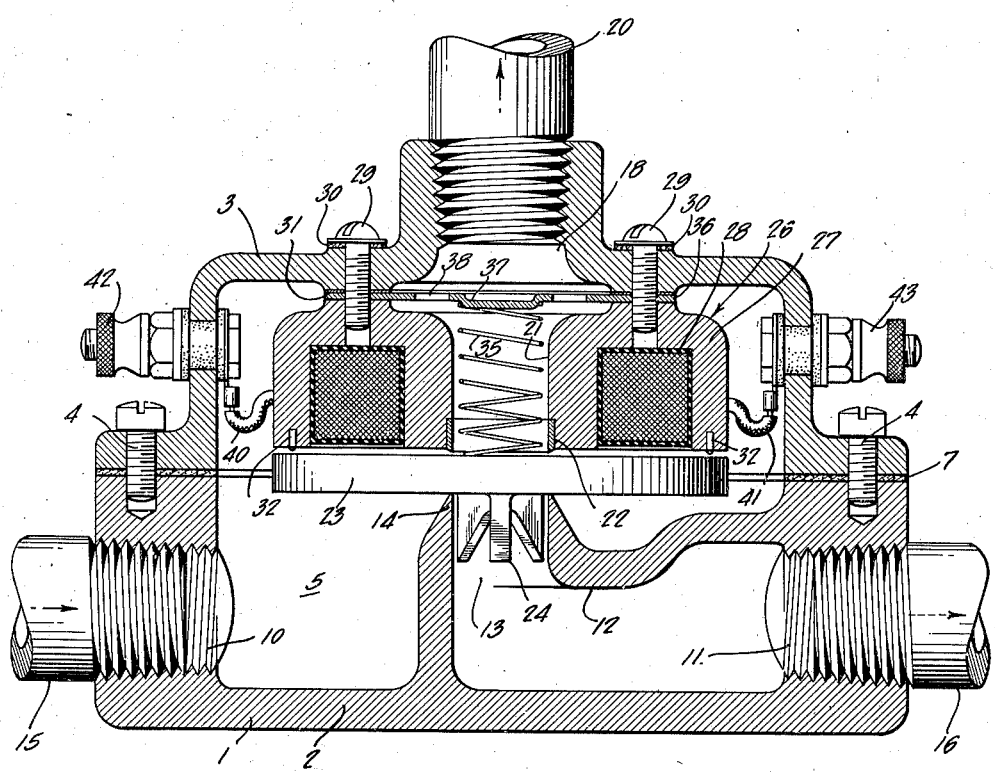
INVENTOR
William A. Ray
BY John Flam
ATTORNEY Patented July 14, 1942

2,289,456

UNITED STATES PATENT OFFICE 2,289,456

ELECTROMAGNETICALLY OPERATED VALVE

William A. Ray, Glendale, Calif.

Application March 26, 1940, Serial No. 326,023

3 Claims. (Cl. 137—139)

This invention relates to the control of the flow of fluids by the aid of an electromagnetically operated valve.

It is one of the objects of this invention to improve in general, valves of this character.

It is another object of this invention to provide a three-way valve that is simple and reliable in structure, and that can be operated by the aid of weak currents. Such devices for example, may be effectively utilized for the control of gaseous or liquid fuels as for heating systems or the like.

This invention possesses many other advantages, and has other objects which may be made more easily apparent from a consideration of one embodiment of the invention. For this purpose there is shown a form in the drawing accompanying and forming part of the present specification. This form will now be described in detail, illustrating the general principles of the invention; but it is to be understood that this detailed description is not to be taken in a limiting sense, since the scope of this invention is best defined by the appended claims.

In the drawing, the single figure is a longitudinal section through a valve incorporating the invention.

Referring to the drawing, the valve includes a body 1 which is preferably substantially circular in plan, and as shown is formed of a lower portion 2, and an upper portion or cap 3, secured together in any suitable manner, as by screws 4 to form an inlet chamber 5.

The joint between the upper and lower portions of the body is rendered fluid tight by means of an appropriate gasket or packing member 7.

The lower body portion 2 has oppositely disposed openings 10 and 11, separated by a partition or web wall 12, having a port or opening 13 passing through it and surrounded by a valve seat 14. Fluid is admitted to the chamber 5 by means of inlet pipe 15 threadedly secured in opening 10 and leading from any suitable source of supply. Fluid is adapted to pass from chamber 5 through port 13 and out through opening 11, which thus forms a discharge opening. A suitable pipe connection 16 conducts the fluid from opening 11 to a desired point. A second discharge outlet 18 is formed in the cap or upper part 3 of the body 1 and is connected with a desired point by means of a pipe 20. A port 21 is provided through which fluid from the chamber 5 is adapted to pass to outlet 18 and is provided with a valve seat 22, facing valve seat 14. A valve closure member 23, comprising a disk formed of magnetic material is interposed between valve seats 14 and 22, and is adapted optionally to cooperate with either seat to close the associated port, 13 or 21 as the case may be, whereby fluid from the inlet 15 may be discharged through the port not so closed.

Closure member 23 has wing guides 24 which cooperate with the walls of port 13 to restrict lateral movement of the member. The weight of member 23 causes it to normally move toward seat 14, and to rest thereon, closing port 13. The fluid pressure in chamber 5 is also effective to maintain member 23 on seat 14.

As a means of lifting member 23 and opening port 13, an electromagnet 26 is provided which has a face substantially coextensive with the disc and spaced closely above it. Magnet 26 has an annular core or frame 27 of U-shaped cross-section, the port 21 being formed centrally therein. An energizing winding 28 is accommodated in the annular space of frame 27. Magnet 26 is supported within the chamber 5 in any suitable manner, as by means of screws 29 which pass through clearance holes in cover 3 and threadedly engage the frame 27. Suitable gaskets, as washers 30, are provided to prevent escape of fluid around the screws.

Since the valve is intended for operation by a weak current, such as from a pilot flame generator, the clearance between disk 23 and the face of magnet 26 when the disk is on seat 14 must be small (for example .015") and must be maintained within close limits. For the purpose of altering this clearance one or more shims such as indicated by 31 are interposed between the top of frame 27 and its point of support on cover 3. At least one of such shims should be of material suitable to form a fluid tight joint at this place, to prevent leakage of fluid chamber 5 into outlet 18. Such a material is, for example, "Neoprene." Valve seat 22 may be formed conveniently of a light metal ring secured in passage 21 in magnet frame 27, as by being pressed in, and projecting a few thousandths of an inch below the face of the magnet.

To steady disk 23 while it is on seat 22 and to guard against its tipping thereon for any reason, as for instance a lack of uniformity in the force exerted by magnet 26 on the disk, a number of pins 32 are provided which project from the face of the magnet. These are preferably of non-magnetic material and disposed around the outer edge of the face of the magnet. The pins 32 extend from the face of magnet 26, the same distance as seat 22 extends therefrom.

To assist disk 23 to its closing position on seat 14, a light compression spring 35 may be provided, if desired. This spring 35 may be conveniently accommodated in port 21 and is confined between the upper side of disk 23 and a plate 36 clamped between magnet frame 27 and the cover 2, shims 31 being interposed between the plate 36 and the cover. Plate 36 has central expressed hub 37 to maintain spring 35 central and a plurality of ports 38 surrounding the hub to permit passage of fluid to outlet 18.

Magnet winding 26 has leads 40, 41 which connect respectively to binding posts 42 and 43, mounted in cover 3 and suitably insulated therefrom.

When magnet 26 is not energized, disk 23 rests on seat 14 and closes port 13, preventing passage of fluid through discharge pipe 16. At the same time, port 21 is open and fluid can pass freely from inlet 10 through discharge passages 18, 20, 21, and past the upper flat face of the armature disc 23. This condition is shown in the drawing. If magnet 26 is energized, closure member 23 is lifted from seat 14 and urged against seat 22, opening port 13 and closing port 21. Passage of fluid through passages 18, 21, etc. is thus stopped, and flow through passages 11, 13, 16 is permitted. When magnet 26 is deenergized closure member 23, by its weight, alone or assisted by spring 35, returns to seat 14, reestablishing flow of fluid to pipe 20 and stopping the flow to pipe 16.

What is claimed is:

1. In a valve structure, a valve body, means forming a chamber in the body into which fluid may be conducted, means forming a valve port leading out of the chamber, means forming a raised valve seat around the port and formed in the chamber, a closure for cooperating with said seat, said closure being made from magnetic material and having a plane surface cooperating with said seat, an electromagnet within said chamber, having a magnetic frame with an annular space therein, said electromagnet also having a coil in said annular space, the frame defining polar areas between which the coil is located, said polar areas cooperating with the closure to move the closure from said valve seat, said frame having a port therethrough, axially of the coil and leading from the chamber, means forming a raised valve seat around the port that extends through the frame of the magnet, said closure having another plane surface cooperating with the raised valve seat around the said last-named port, when the electromagnet is energized, the air gap between the said other plane surface and the polar areas when the electromagnet is deenergized being of the order of fifteen one-thousandths of an inch.

2. In a valve structure, a valve body, means forming a chamber in the body into which fluid may be conducted, means forming a port leading out of the chamber, a closure for controlling said port, said closure being made from magnetic material, an electromagnet within said chamber, said electromagnet having a magnetic frame detachably secured to an inner wall of said chamber, said frame forming polar areas for cooperating with said closure, there being an axial aperture in the frame, communicating with said port and having means forming a valve seat for cooperating with said closure, a compression spring in the aperture operating at one end against said closure, and a plate interposed between the frame and the wall for forming an abutment for the other end of said spring, energization of said magnet causing said closure to move in opposition to said spring to perform a valving operation, the pressure of said spring being effective, when the magnet is deenergized, to move said closure in the opposite direction.

3. In a valve structure, a valve body, means forming a chamber in the body into which fluid may be conducted, means forming a valve port leading out of the chamber, a closure cooperating with said port, said closure being made from magnetic material, an electromagnet within said chamber, said electromagnet having a magnetic frame detachably secured to an inner wall of said chamber, said frame forming polar areas for cooperating with said closure, there being an axial aperture in the frame, a compression spring in the aperture operating at one end against said closure, said closure also cooperating with said aperture to control flow of fluid therethrough, and an apertured plate interposed between the frame and the wall for forming an abutment for the other end of said spring.

WILLIAM A. RAY.